April 11, 1967  A. W. LOHMANN  3,314,052
LIGHT MODULATION SYSTEM
Filed April 12, 1963  6 Sheets-Sheet 5

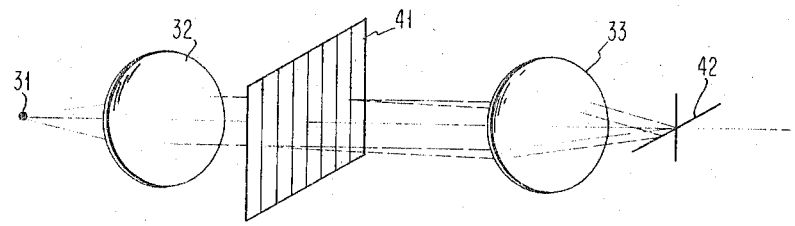
FIG. 4
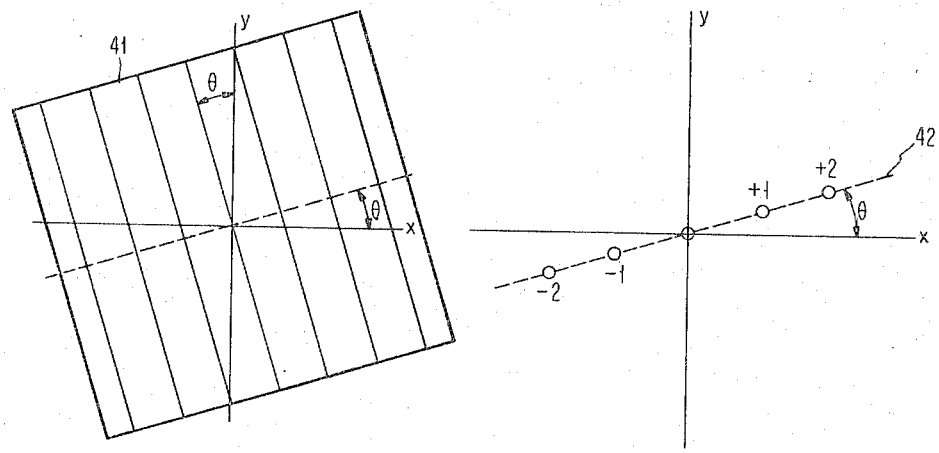
FIG. 5
FIG. 6
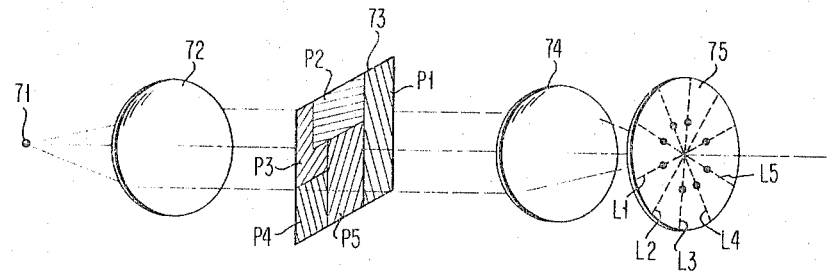
FIG. 7

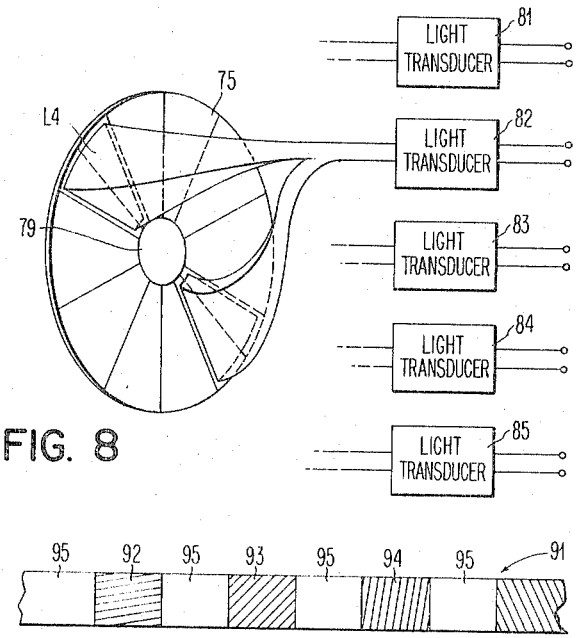
FIG. 8
FIG. 9
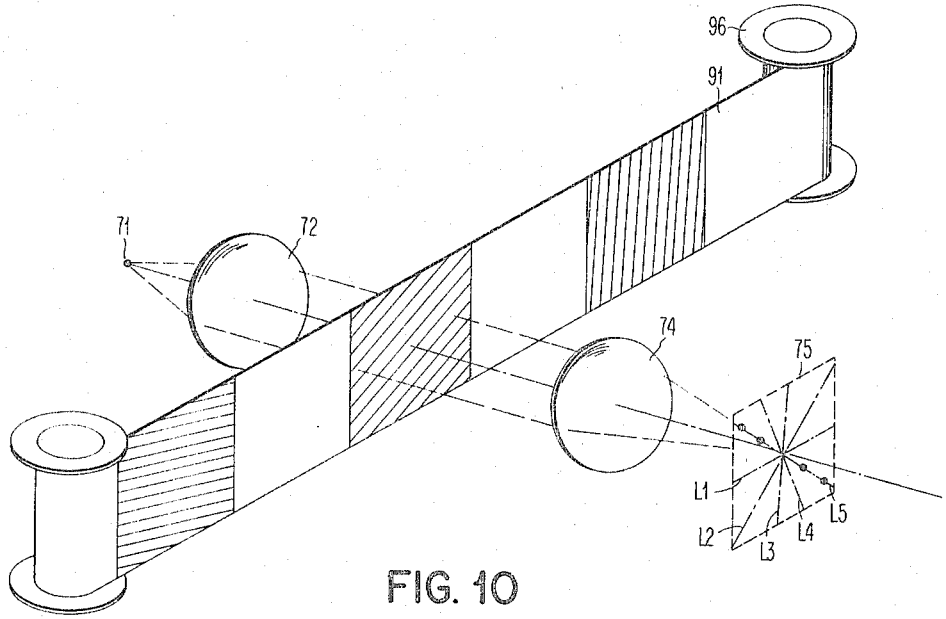
FIG. 10

April 11, 1967  A. W. LOHMANN  3,314,052
LIGHT MODULATION SYSTEM
Filed April 12, 1963  6 Sheets-Sheet 6
FIG. 18A
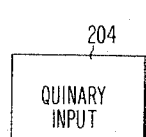
204 QUINARY INPUT
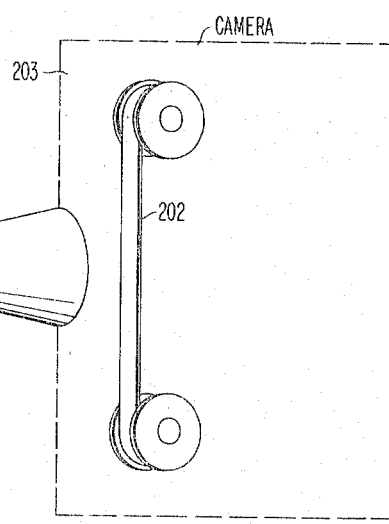
CAMERA 203, CRT 201, 202
  206
  207
  208
  209
  210
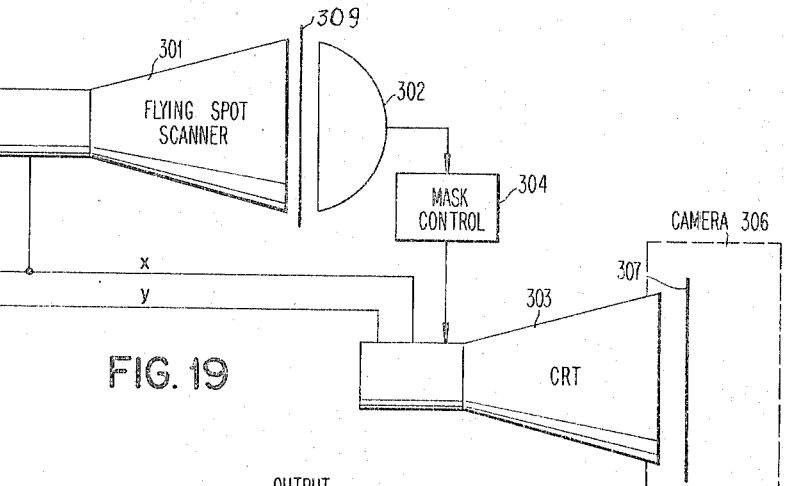
FIG. 19
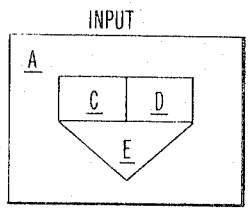
FIG. 20
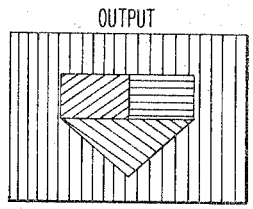
FIG. 21

3,314,052
LIGHT MODULATION SYSTEM
Adolf W. Lohmann, Los Gatos, Calif., assignor to International Business Machines Corporation, New York, N.Y., a corporation of New York
Filed Apr. 12, 1963, Ser. No. 272,793
12 Claims. (Cl. 340—173)

This invention relates to optical systems and more particularly to coding, transmission and operation upon information transmitted through optical systems.

Periodic modulation processes such as amplitude modulation and frequency modulation can be accomplished both in electronic and in optical systems. The present invention is directed to a periodic modulation process which is only possible in optical systems. The reason that the present process is only possible in optical systems is that in electronic systems only two coordinates, namely, time and amplitude are available, whereas, in optical systems additional coordinates are available due to the fact that the signal is always spread out in space, that is in the $x$ and $y$ directions.

Previous light modulation schemes utilized the time and amplitude coordinates corresponding to the manner that these same coordinates have been modulated in electronic systems and certain optical systems also make use of the $x$ and $y$ space coordinates. The present invention introduces another coordinate into light modulation systems. This additional coordinate physically appears as the angular orientation of a diffraction grating through which light passes. By modulating the angular orientation of a grating through which light rays pass, the light rays can be made to carry information and this information can later be demodulated from the light rays. Furthermore the light rays which are carrying the information can be operated upon to produce any arbitrary system response including non-linear and non-monotonic responses. The angular orientation of the grating (hereinafter called the theta angle) is independent of the time, amplitude and space coordinates, thus, the theta coordinate can be used to carry information in addition to carrying information by the other coordinates.

The object of this invention is to provide an improved means of modulating and demodulating light.

A further object of the present invention is to provide an improved means of processing optical information.

Yet another object of the present invention is to provide a system having any desired arbitrary response.

Another object of the present invention is to provide a system having a non-monotonic response.

A still further object of the present invention is to provide an optical system having multiple thresholds.

Yet another object of the present invention is to provide a system wherein optical information can be coded at higher density.

Still another object of the present invention is to provide a simple inexpensive reliable means of modulating a light beam.

Still another object of the present invention is to provide a system for theta encoding a record.

Theta modulation can be used in several different types of systems. However each of the systems has in common the fact that parallel light rays are directed at a theta encoded object. After passing through the theta encoded object the light rays are focused by a converging or camera lens. The position of the image of the light source in the second focal plane of the converging lens (hereinafter called the Fraunhofer plane) is only dependent upon the direction of the parallel rays which enter the converging lens and not upon the position at which the rays enter the lens (see page 88, Optics by F. W. Sears, Addison-Wesley Inc., 1958). The theta angle of the object determines the direction of the light entering the camera lens and hence the theta angle of the object determines the position of the image in the Fraunhofer plane. For a particular theta angle of the object, images in the Fraunhofer plane appears along a line having a particular angular orientation. Theta encoded light can be demodulated, that is, the theta angle of the object or record can be determined by detecting the angular position of the image in the Fraunhofer plane. The theta encoded light can alternately be allowed to pass through the Fraunhofer plane and to form an image of the object at the image plane of the converging lens. By selectively controlling the passage of light through areas in the Fraunhofer plane any desired system response between the theta angle in the object and illumination in the image plane can be obtained.

Other novel features of the present invention are directed to systems for encoding theta modulated records.

The foregoing and other objects, features and advantages of the invention will be apparent from the following more particular description of preferred embodiments of the invention, as illustrated in the accompanying drawings.

FIGURE 4 is a schematic diagram showing the effect of a diffraction grating in the system shown in FIGURE 3.

FIGURE 5 is a plan view of the diffraction grating shown in FIGURE 4 indicating the theta angle of the grating.

FIGURE 6 is a schematic diagram showing the image in the Fraunhofer plane due to the diffraction grating shown in FIGURE 5.

FIGURE 7 is a schematic diagram of a first preferred embodiment of the present invention showing the effect of an object having a plurality of sections with different theta angles.

FIGURE 8 is a perspective view of the receiver shown schematically in FIGURE 7.

FIGURE 9 is a plan view of a theta encoded tape.

FIGURE 10 is a schematic view of the first embodiment of the invention showing how the theta encoded tape shown in FIGURE 9 is read.

FIGURES 18A to 18F show a system for theta modulating a tape which can be read by the system shown in the first embodiment of the invention.

FIGURE 19 shows a system for encoding an image which can be read using the second embodiment of the present invention.

FIGURE 20 shows an input image for the system shown in FIGURE 19.

FIGURE 21 shows theta encoded record generated by the system shown in FIGURE 19.

Figure 1:
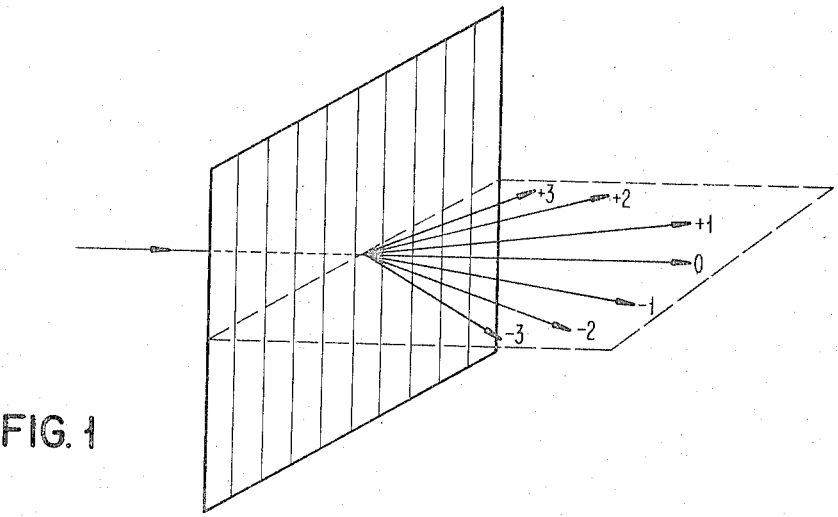
FIGURE 1 is a schematic diagram showing the diffraction of a single ray of light by a diffracting grating.
Figure 2:
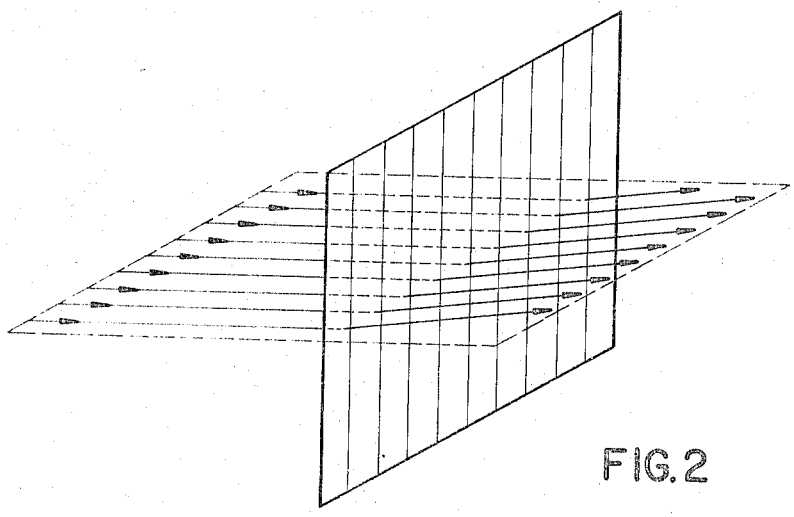
FIGURE 2 is a schematic diagram showing the diffraction of a plurality of parallel light rays by a diffraction grating.

In order to clarify and simplify the explanation of the invention several optical principles will first be discussed in detail. FIGURE 1 shows the effect of an optical grating. A ray of light incident upon the grating is diffracted or bent into rays traveling in several different directions. The deflected rays are designated as the zero order, the plus and minus one order, the plus and minus two order, etc. The amount of diffraction (the angular deflection) is dependent upon the frequency of the light and the spacing of the lines in the grating. Light of a particular frequency is always deflected the same amount by a particular grating. The relative intensity of the light in the various orders is dependent upon the characteristics of the grating and it is well known that a grating can be fabricated so that one particular order predominates. FIGURE 2 shows how parallel rays of the same frequency are all deflected by the same amount. Naturally it should be understood that FIGURE 2 only shows first order diffraction.

Figure 3:
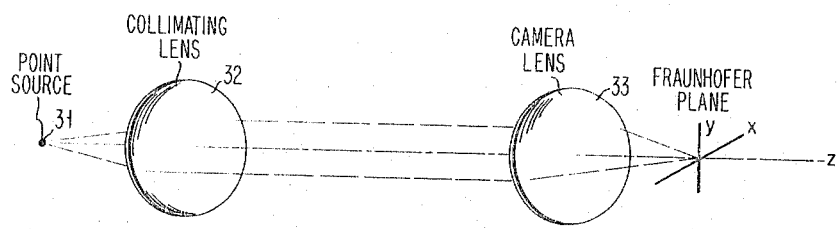
FIGURE 3 is a schematic diagram of a simple optical system.

A simple optical system sometimes referred to as a Schlieren system is shown in FIGURE 3. The system consists of a monochromatic point source 31, a collimating lens 32 and a converging or camera lens 33. The second focal plane of the camera lens 33 is designated as the Fraunhofer plane. The light rays between collimating lens 32 and camera lens 33 are substantially parallel. In the present embodiment point source 31 and collimating lens 32 merely form a convenient manner of obtaining parallel light and any of the corresponding means of obtaining parallel light known in the art, such as a laser, may be used.

FIGURE 4 shows the effect of placing a diffraction grating 41 between collimating lens 32 and converging lens 33. The rays corresponding to the first order diffraction are indicated by dashed lines. It is seen that in the Fraunhofer plane the only effect of the diffraction grating is to move the image of the point source laterally. The direction that the image is moved in the Fraunhofer plane is dependent upon the theta angle (that is, the angular orientation of the slits) in grating 41. The amount that the image in the Fraunhofer plane is moved along line 42 is dependent upon the amount of diffraction which in turn is dependent on the frequency of the light and the characteristics of grating 41. If the light from source 31 is monochromatic the image along line 42 is one point for each diffraction order (FIGURE 4 only shows the effect of one order of diffraction). However, if the light from source 31 contains a plurality of colors, each color component is diffracted a different amount and hence a spectrum appears along line 42. It should be particularly noted that the light passing through each spatial position in the diffraction grating 41, that is, light passing through each $x$ and $y$ position in diffraction grating 41, is focused at one point in the Fraunhofer plane for each order of diffraction.

FIGURES 5 and 6 show the relationship between the theta angle of the grating and the angular orientation of the image in the Fraunhofer plane. The theta angle of the grating is defined as the angle subtended by the lines in the grating and a vertical line. FIGURE 5 shows the orientation of grating 41 and FIGURE 6 shows the orientation of line 42. It is noted that the inclination of line 42 from the horizontal axis corresponds to the theta angle of grating 41. FIGURE 6 also shows the details of the images on line 42. It should be noted that each of the diffraction patterns, that is, the zero order, the plus and minus one orders, plus or minus two orders, etc. form an image along line 42. For simplicity these are not shown in FIGURE 4. If source 31 produced white light (i.e., all different colors) a continuous color spectrum would appear along line 42.

FIGURE 7 shows the first embodiment of the present invention. It includes a monochromatic point source 71, a collimating lens 72, a theta encoded image 73, a converging lens 74 and a receiver 75 (receiver 75 is only shown schematically in FIGURE 7 and it will be explained in detail later). The theta encoded image 73 is positioned between collimating lens 72 and converging lens 74. Receiver 75 is positioned at the Fraunhofer plane of lens 74. The theta encoded object 73 includes five sections designated P1 to P5 each of which has a diffraction grating therein oriented in a particular direction. The orientation of the gratings in sections P1 to P5 relative to the vertical, that is, the theta angle of sections P1 to P5 is:

|  | Degrees |
|---|---|
| (a) Section P1 | 15 |
| (b) Section P2 | 87 |
| (c) Section P3 | 123 |
| (d) Section P4 | 15 |
| (e) Section P5 | 159 |

The images generated in the Fraunhofer plane thus appear along lines L1, L3, L4 and L5, which are respectively oriented 15 degrees, 87 degrees, 123 degrees and 159 degrees from the horizontal. No image appears along line L2 since there is no section of object 73 which has a theta angle of 51 degrees. Each of the lines L1 to L5 is the center line of a reception area which subtends thirty-six degrees. These areas in the Fraunhofer plane will hereinafter be designated areas L1 to L5.

FIGURE 8 shows the details of receiver 75. It includes five light transducers 81 to 85. Each of the five reception areas L1 to L5 has associated therewith a bundle of optical fibers leading from the associated area to one of the transducers 81 to 85. For clarity and illustration only one of the bundles of optical fibers, namely the optical fibers connecting area L4 to transducer 82 are shown in FIGURE 8. When light falls on one of the areas L1 to L5 the light is transmitted through the associated optical fibers to the associated light transducer which produces an electrical output signal. The light transducer 81 to 85 may, for example, be photocells. The center area 79 of receiver 75 is opaque to prevent any output from the zero order diffraction because the zero order diffraction pattern is common for all values of theta.

FIGURE 9 shows a tape 91 which contains theta encoded information. The code used is based upon each different theta angle indicating a different value of information. In the particular embodiment shown herein five different theta angles each separated by thirty-six degrees indicate the five different values of a quinary code. The tape 91 consists of transparent areas 92, 93 and 94 separated by opaque areas 95. Each of the transparent areas has a diffraction grating therein, the lines in which are oriented according to a particular theta angle, to indicate a particular one of the five possible values. Tape 91 may, for example, be fabricated by bonding conventional diffraction gratings to transparent tape and by covering the space between the diffraction gratings with opaque material. Other means of fabricating tape 91 will be discussed later.

The theta encoded tape 91 is read as shown in FIGURE 10. A selected one of the information bearing areas 92 to 94 is positioned between lenses 72 and 74 by tape positioning mechanism 96. Depending upon the theta angle of the segment of the tape positioned between the lenses, an image is formed in a particular one of the areas L1 to L5 and thus a particular one of the transducers 81 to 85 is activated. The particular transducer which is actuated indicates the theta angle of the segment of tape being illuminated. Since the mechanical tape positioning mechanism 96 is conventional in design, it is not shown or explained in detail.

In summary, FIGURES 7, 8 and 10 show a system capable of demodulating or reading theta encoded information. The theta encoded record is placed between lenses 72 and 74 and depending upon the theta angle of the object an image is formed in one of the areas L1 to L5 thereby activating a selected one of the transducers 81 to 85. The particular transducer which is activated indicates the theta angle of the particular document being read.

Figure 11:
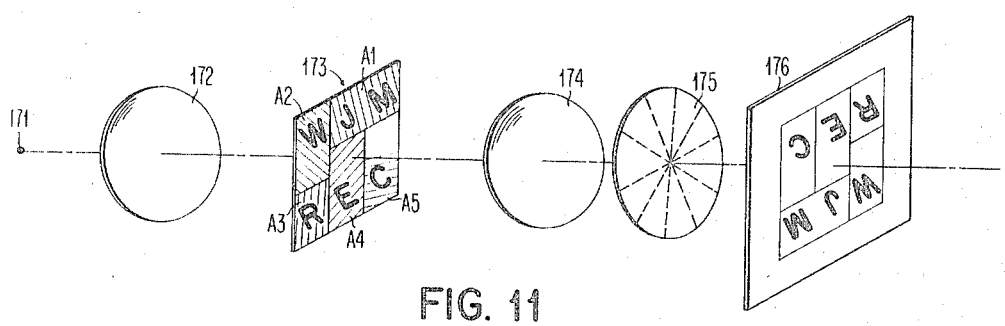
FIGURE 11 is a schematic diagram of a second preferred embodiment of the present invention.

A second embodiment of the invention is shown in FIGURE 11. It includes a monochromatic light source 171, a collimating lens 172, an input image or record 173, a converging lens 174, a mask holder 175 and a screen 176 at the image plane of lens 174. Record 173 has five areas A1 to A5 each of which is partially opaque and partially transparent. The opaque part of each area forms a letter. The letters JM, W, R, E and C are respectively formed in areas A1 to A5. The transparent portion of each area has diffraction lines therein. The orientation of the diffraction lines in each area is given below:

|  | Degrees |
|---|---|
| (a) Area A1 | 15 |
| (b) Area A2 | 51 |
| (c) Area A3 | 87 |
| (d) Area A4 | 122 |
| (e) Area A5 | 159 |

Instead of interrupting the light at the Fraunhofer plane as was done in the first embodiment of the invention some of the light is allowed to pass through the Fraunhofer plane to form an image of selected areas of the theta encoded object 173 on screen 176. Naturally the distance from lens 174 to screen 176 can be made shorter by use of another lens; however, for simplicity no other lens is shown herein.

As previously explained in the Fraunhofer plane the position of the light is only dependent upon the theta angle. Changes in $x$ and $y$ positioning in the object plane do not cause any observable changes in the Fraunhofer plane. However, changes in the $x$ and $y$ positioning in the object plane do cause corresponding changes in $x$ and $y$ positioning in the image plane.

If no mask is placed in mask holder 175 an exact image of object 173 (neglecting distortion introduced by the lenses) is produced at screen 176. As previously explained each different theta value of the object passes through a different area in the Fraunhofer plane. By blocking the light in selected areas in the Fraunhofer plane light from areas of the object which are coded in the selected theta angles can be prevented from reaching screen 176.

Since object or record 173 shown in FIGURE 11 has five areas A1 to A5 each having a different theta angle, light passes through each of the areas L1 to L5 in the Fraunhofer plane.

Figure 12:
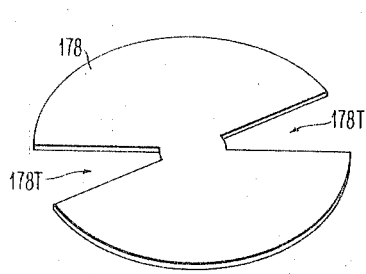
FIGURE 12 is a perspective view of a mask which can be used in the second embodiment of the invention.
Figure 13:
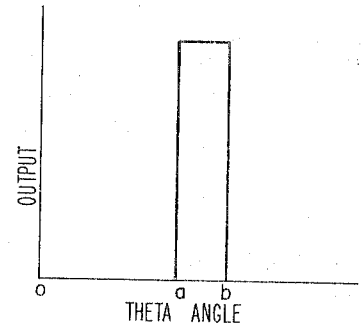
FIGURE 13 is the system response due to the mask shown in FIGURE 13.

FIGURE 12 shows a mask 178 which is opaque except for two truncated triangular sections 178T which are transparent. The center area of the mask is opaque in order to block the light from the zero order diffraction because the zero order diffraction pattern is common for all theta angles. If mask 178 is positioned in holder 175 light can only pass through a selected one of the areas L1 to L5. Since light passing through each of the differently theta encoded areas A1 to A5 passes through a different one of the areas L1 to L5, with mask 178 in the system, only the light passing through a selected one of the theta encoded areas A1 to A5 can reach receiver 176. Using mask 178 a band pass system response such as shown in FIGURE 13 is obtained. In FIGURE 13 the light output at receiver 176 is plotted as a function of the theta angle of the record object through which the light passes. For those areas of the object wherein the theta angle is between zero and "$a$" degrees no light reaches screen 176. For those areas of the object where the theta angle is between "$a$" and "$b$" degrees an image appears at screen 176. For those portions of the object wherein the theta angle is greater than "$b$" degrees no light appears at screen 176. For example, if the transparent portion of mask 178 is positioned in area L1 only the light passing through area A1 of record 173 would reach screen 173 and merely the letters JM would appear on screen 176.

Figure 14:
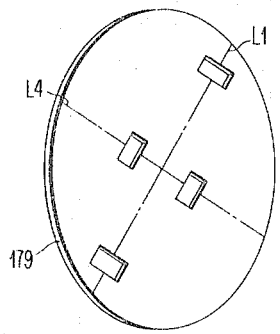
FIGURE 14 is a perspective view of a more complex mask which can be used in the Fraunhofer plane of the second embodiment of the invention.

Various types of light sources and various types of masks other than that shown in FIGURE 12 can be used. For example, if a white light source is substituted for monochromatic light 171 a spectrum appears in each of the areas L1 to L5 as previously explained. Mask 179 shown in FIGURE 14 allows one part of the spectrum to pass through in area L1 and a different part of the spectrum to pass through in area L4. Thus, with mask 179 in mask holder 175 the light arriving at screen 176 is theta modulated and color demodulated. In order to reach screen 176 the light must fulfill two conditions. It must be theta modulated in the appropriate manner and it also must be of the appropriate color or frequency. The color of an image appearing at screen 176 can be changed by merely changing the radial position of the slots in the mask.

Figure 15:
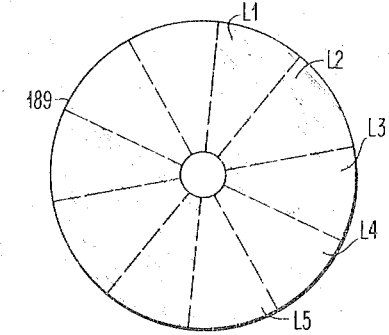
FIGURE 15 is a perspective view of a mask which has several different degrees of transparency.
Figure 16:
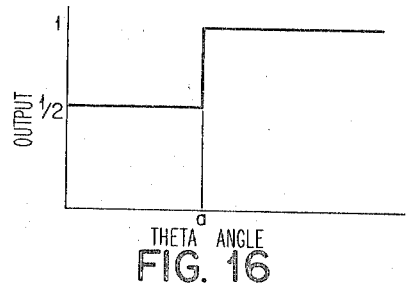
FIGURE 16 is a graph showing the system response due to the mask shown in FIGURE 15.

By using partially transparent masks in the Fraunhofer plane the amplitude of the output signal can also be controlled. FIGURE 15 shows a mask 180 wherein areas L1, L2 and L3 are partially transparent, that is they transmit half the light incident thereon, areas L4 and L5 are totally transparent and the center portion 180 C is opaque. The system response obtained with such a mask is shown in FIGURE 16. For theta angles between zero and one hundred and eight degrees, that is for theta angles such that the light falls in areas L1 to L3 the output response is one-half, whereas for larger theta angles, that is, theta angles which fall within areas L4 and L5, the output response is one.

By appropriately shaping the mask and by using areas with different transmissivity in the mask any arbitrary system response (either monotonic or non-monotonic) can be obtained.

The second embodiment has thus far been described as utilizing a mask 176 in the image plane to produce a visual output from the system. If an electrical output is desired, an array of photoelectric transducers similar to that shown in FIGURE 8 can be used.

Figure 17A:
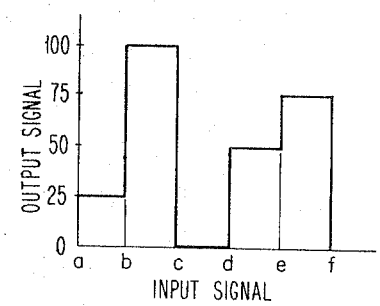
FIGURE 17A is a graph showing a non-linear non-monotonic system response.
Figure 17B:
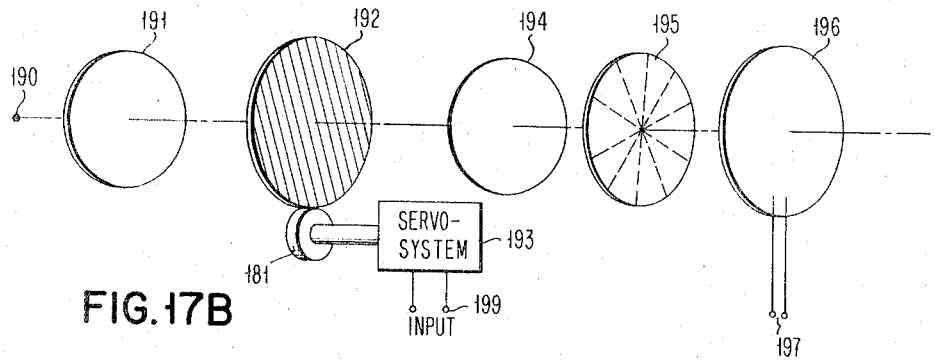
FIGURE 17B is a schematic diagram of a third embodiment of the invention.

A third preferred embodiment of the invention is shown in FIGURES 17A, 17B, 17C and 17D. In the third embodiment a theta modulation system is used as an intermediary between an electrical input and an electrical output. As will be explained the third embodiment can be used to obtain a system having an arbitrary non-linear and non-monotonic system response. For example, using the mask shown in FIGURE 17C the system has the response shown in FIGURE 17A. In FIGURE 17A the output generated by the system is shown as a function of the input applied to the system.

The third embodiment includes a point light source 190, a collimating lens 191, a rotatable diffraction grating 192, a converging or camera lens 194, a mask holder 195, an optical transducer 196, and a servomechanism 193 for rotating diffraction grating 192. The system also includes input terminals 199 and output terminals 197. Depending upon the particular input voltage applied to terminals 199, servosystem 193 rotates grating 192 to a particular location. The orientation that servosystem 193 imparts to grating 192 for various input voltages is shown in FIGURE 17D. The vertical axis in FIGURE 17D shows the angular orientation of the slots in the grating 192 relative to a vertical reference and the horizontal axis shows the input voltage. With no voltage applied to terminals 199 the slots in grating 192 are vertical and as the voltage applied to input 199 increases grating 192 is rotated as a linear function of the input voltage. Since servomechanisms such as servomechanism 193 are conventional no details are given herein.

Point source 190 need not be monochromatic. The color of light is of no consequence to this particular embodiment of the invention. The light source 190 is referred to as a point source, however, it naturally should be understood that this is a term of art and really what is meant is a very small light source.

Transducer 196 may, for example, be a photocell with an amplifier which generates a voltage at terminals 197. The magnitude of the voltage at terminals 197 is a direct function of the amount of light falling upon the face of transducer 196. Such transducers are conventional and hence transducer 196 is not explained in detail.

Figure 17C:
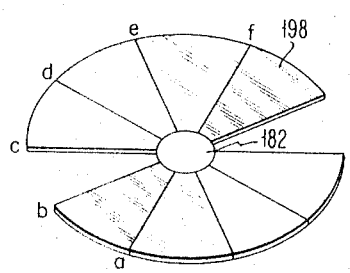
FIGURE 17C is a mask for the system shown in FIGURE 17B which will produce the system response function shown in FIGURE 17A.
Figure 17D:
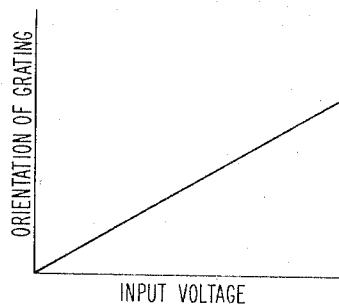
FIGURE 17D is a graph showing the linear response of the angular orientation of the diffraction grating of FIGURE 17B to applied input voltage.
Figure 18B:
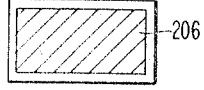
Figure 18C:
Figure 18D:
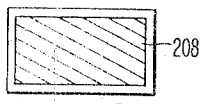
Figure 18E:
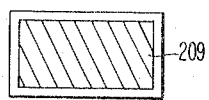
Figure 18F:

In order to obtain the response shown in FIGURES 17A, mask 198 shown in FIGURE 17C must be placed in mask holder 198. Mask 198 has various areas which transmit various portions of the light incident thereon as given below:

(a) The area between lines "a" and "b" transmits one-fourth of the light incident thereon.

(b) The area between lines "b" and "c" transmits all of the light incident thereon.

(c) The area between lines "c" and "d" transmits none of the light incident thereon.

(d) The area between lines "d" and "e" transmits one-half of the light incident thereon.

(e) The area between lines "e" and "f" transmits three-fourths of the light incident thereon.

(f) The center portion 182 is opaque.

As previously explained the particular area in the Fraunhofer plane (i.e., the plane wherein mask holder 195 is located) through which the light passes, depends upon the orientation of grating 192. Hence, when grating 192 is oriented in a particular direction in response to a signal applied to input 199 the light falls in a particular area of mask 198. Depending upon the transparency of the area whereon the light falls, a certain portion of the light may pass through mask 198 and reach transducer 196 thereby producing a signal on output 197. Since the orientation of grating 192 is dependent upon the signal applied to input 199 and since the light passing through the Fraunhofer plane to transducer 196 is dependent upon the orientation of grating 192, the signal generated by transducer 196 at output terminals 197 is a function of the input signal applied at terminals 199. The particular function which relates the input signal applied at terminals 199 to the signal generated at output terminals 197 is dependent upon the shape and transparency of the mask placed in holder 195.

The theta modulation concept of the present invention can also be applied for other purposes. For example, with a system such as shown in FIGURE 11 the theta modulation concept can be applied to a multiplexing system. The word multiplexing is used herein to convey the idea of using a channel for the simultaneous transmission of several independent messages. In the present system two messages could be encoded using four values of theta. The first value is used for the background area, the second value is used for the area which is common to both messages, the third value is used for the areas which only relate to the first message and the fourth value is used for the areas which only relate to the second message. The two messages can be separated by a mask in the Fraunhofer plane. If light with the first and the second type of theta coding is allowed to pass through the Fraunhofer plane to screen 176 the first message appears on the screen, whereas if light with the second and third types of theta encoding is allowed to pass through the Fraunhofer plane the second message appears on the screen.

The theta modulation concept can also be applied to form an associative memory. For example, various data can be stored on a record using different theta angles. In order to select all the messages encoded with a particular theta angle, a mask would be placed in the Fraunhofer plane blocking all light except in the area which passes light encoded with the desired theta angle.

The specific embodiment shown herein used diffraction grating having transparent opaque lines or slits therein. There are several different types of diffraction gratings known in the art and it should be understood that any periodic structure with equally spaced parallel elements can be substituted for the type of diffraction gratings specifically shown herein. One convenient material from which a theta modulated phase grating can be conveniently fabricated in thermoplastic material.

A system for producing theta encoded records is shown in FIGURES 18A to 18F. The basic element in the system is a Charactron (trademark) type of cathode ray tube 201. A Charactron (trademark) tube is a cathode ray tube which includes an electron gun (not explicitly shown) and a plurality of masks (see FIGURES 18B to 18F). The electron beam from the electron gun can be directed through a particular one of the masks to the face of the tube under the control of input signals. Such tubes are well known in the art and no further description of the details thereof is given herein.

In the present instance each of the masks in the tube has strips therein oriented in a particular direction. The five different masks in tube 201 are shown in FIGURES 18B to 18F. Each mask has ten strips across the aperture in the mask, the strips in each of the masks being oriented in a different direction to indicate five different values of a quinary code.

A film 202 which is to be theta encoded is inside a camera 203. The camera 203 is capable of transferring images from the face of cathode ray tube 201 to film 202. Such cameras are commercially available and hence camera 203 is not shown or described in detail herein. Input 204 supplies signals which cause the electron beam in tube 201 to be directed through one of the five masks 206 to 210. This produces an image on the face of tube 201 which consists of a number of lines oriented in a particular direction. The orientation of the lines, that is, the theta angle of the lines is dependent upon the particular signal received from input 204. The film 202 can later be developed in a conventional manner. The result is a film having a plurality of theta encoded images thereon each theta encoded image representing one out of five possible values. The tape so produced can be read with a system such as that shown in FIGURE 10.

It should be noted that with tube 201 the image always appears at the same place on the face of the tube, however, depending upon which mask the electrons are directed through under the control of input 204 the lines which appear in the image on the face of the tube are oriented differently. The system could be provided with other circuitry to move the location of the image in the face of the tube thereby making it possible to record two or more images on the film without moving the film.

A system for theta encoding records which carry information by $x$ and $y$ positioning in addition to carrying information by theta modulation is shown in FIGURE 19. This system consists of a flying spot scanner 301, a photomultiplier tube 302, a cathode ray tube 303, a camera 306, a mask control circuit 304 and an $x$–$y$ position control circuit 305. Cathode ray tube 303 is similar to the tube 201 which was previously described; however, it has additional control circuitry which will be described. Mask control circuit 304 controls which mask the electrons pass through in tube 303 and $x$–$y$ position control circuit 305 simultaneously controls the position of the spot on the face of flying spot scanner 301 and the position of the image generated by cathode ray tube 303. It is noted that in the cathode ray tube 201, previously discussed, the image always appears at the same position on the face. With cathode ray tube 303 the position of the image on the face of the tube is controlled by position control 305. An input image on record 309 is positioned between flying spot scanner 301 and photomultiplier tube 302. The output image on record 307 is produced in camera 306.

A sample input image is shown in FIGURE 20. It consists of four different types of areas each having a particular shape. Other information (e.g., color) is indicated by the relative transparencies of the areas. The transparency of the various areas is indicated by the letters A to E in FIGURE 20. The letters A to E indicate a scale of transparency wherein A indicates total transparency and E indicates a totally opaque area. A sample of the type of output image which results from the system is shown in FIGURE 21. The shapes of the various areas are identical to that in the input image; however, instead of having different transparencies, the areas have different theta angles.

The system shown in FIGURE 19 operates as follows: Position control 305 directs the spot generated by tube 301 to a particular position on image 309. Depending upon the transparency of this particular spot photomultiplier tube 302 generates a particular signal. Mask control 304 interprets the signal from photomultiplier tube 302 and selects a particular one of the masks in cathode ray tube 303. Position control 305 directs the electron beam in cathode ray tube 303 to the spot on the face of tube 303 corresponding to the spot on the face of tube 301 then being illuminated. The result is that depending on the transparency of a particular spot in image 309 lines are projected on the face of cathode ray tube 303 at the corresponding location having a particular orientation. The image on the face of tube 303 is transferred to film 307 through camera 306. The result is an image such as that shown in FIGURE 21.

The output image is interrogated with a system such as that shown in FIGURE 11. Using a mask in the Fraunhofer plane which has different transmissivity in different areas and using a white light source, the various areas of the record which have different theta values appear on screen 176 as different colors. The colors of the different areas can be changed merely by changing the mask in the Fraunhofer plane of the system.

Instead of using a cathode ray tube having masks with slots therein to produce the output image a cathode ray tube which has an electron gun in the form of an array of line sources (instead of the usual point source) can be used. In such a system circuit 304 would be connected to a yoke on the cathode ray tube which rotates the image as required. Other types of conventional cathode ray tube systems could also be programmed to generate the required images to form a theta modulated record.

While the invention has been particularly shown and described with reference to preferred embodiments thereof, it will be understood by those skilled in the art that various changes in the form and details may be made therein without departing from the spirit and scope of the invention.

What is claimed is:

1. A system comprising,
a point source of light,
a collimating lens,
a converging lens,
a diffraction grating positioned between said collimating lens and said converging lens,
a signal input means,
means for modulating the angular orientation of said grating in response to said signal input means,
a mask in the Fraunhofer plane of said converging lens, said mask having areas of varying transmissivity, and detecting means in the image plane of said converging lens to detect the amount of light incident upon said detecting means.

2. A method of transmitting data comprising,
generating substantially parallel light rays, orientating a diffraction grating to indicate data by the angular orientation of the diffraction grating,
modulating said light rays by said diffraction grating,
next passing said light through a converging lens, and
detecting the angular position of the image in the Fraunhofer plane of said converging lens to thereby detect the particular data transmitted.

3. A system for reading information comprising,
a point source of light,
a collimating lens,
a converging lens,
a record positioned between said collimating lens and said converging lens, said record having a diffraction grating therein, said diffraction grating being oriented in a particular direction to indicate information, and
means for detecting the position of images in the Fraunhofer plane of said converging lens thereby detecting the orientation of said grating and the information indicated thereby.

4. A system for reading information,
a source of substantially parallel light rays,
a converging lens,
an encoded record positioned between said light source and said converging lens, said record having a diffraction grating therein oriented in a particular direction, the direction of orientation indicating information, and
means for detecting the position of images in the Fraunhofer plane of said converging lens, thereby detecting the orientation of said grating and the information indicated thereby.

5. A system for reading information,
a source of substantially parallel light rays,
a converging lens,
a theta encoded record positioned between said light source and said converging lens, the theta angle of said record indicating information, and
means for detecting the position of the images in the Fraunhofer plane of said converging lens, thereby indicating the theta angle of said record.

6. A system for reading information comprising,
a point source of light,
a collimating lens,
a converging lens,
a record positioned between said collimating lens in said converging lens, said record having a diffraction grating therein, said diffraction grating being oriented in a particular direction to indicate information, and
a plurality of light responsive devices positioned in the Fraunhofer plane of said converging lens, whereby the particular one of said light responsive devices activated indicates the orientation of said grating and the information indicated thereby.

7. A system for reading information,
a source of substantially parallel light rays,
a converging lens,
a tape bearing a series of theta encoded records,
means for positioning a selected one of the records between said light source and said converging lens, and
means for detecting the position of images in the Fraunhofer plane of said converging lens, thereby detecting the theta angle of the record then positioned between said light source and said converging lens.

8. A system for reading information,
a source of substantially parallel light rays,
a converging lens,
a tape bearing a series of theta encoded records, means for positioning a selected one of the records on said tape between said light source and said converging lens, and a plurality of light responsive devices positioned in the Fraunhofer plane of said converging lens, whereby the particular light responsive device activated indicates the theta angle of the record then positioned between said light source and said converging lens.

9. A system comprising,
a source of substantially parallel light rays,
a converging lens,
a theta encoded record positioned between said light source and said converging lens,
image means in the image plane of said converging lens for creating an image of said record, and
a mask in the Fraunhofer plane of said lens which allows selective images to reach said image means thereby generating on said image means an image which is a function of said record, the particular function depending upon said mask.

10. A system comprising,
a point source of light,
a collimating lens,
a converging lens,
a theta encoded record positioned between said collimating lens and said converging lens,
image means in the image plane of said converging lens for creating an image of said record, and
a mask in the Fraunhofer plane of said lens which allows selective images to reach said image means, thereby generating on said image means an image which is a function of said record, the particular function depending upon the configuration of said mask.

11. An optical system comprising,
a source of collimated light,
a diffraction grating in the path of said light,
a signal input means,
means for modulating the angular orientation of said grating in response to said signal input means,
converging means having a focal plane and an image plane,
means for modifying the transfer function in the focal plane of said converging means, and
output means detecting said light after it passes through said focal plane.

12. A system comprising,
a source of substantially parallel light rays,
a collimating lens for said light rays,
a converging lens for said light rays,
a diffraction grating positioned between said light source and said converging lens,
a signal input means,
means for modulating the angular orientation of said grating in response to said signal input means,
a mask in the Fraunhofer plane of said converging lens, said mask having areas of varying transmissivity, and
detecting means in the image plane of said converging lens to detect the amount of light incident upon said detecting means.

References Cited by the Examiner
UNITED STATES PATENTS

| | | | |
|---|---|---|---|
| 2,050,417 | 8/1936 | Bocca | 352—66 X |
| 2,834,005 | 5/1958 | Ketchledge | 340—173 |
| 2,891,108 | 6/1959 | Wiens | 178—6.7 |
| 2,943,147 | 6/1960 | Glenn | 340—173 |
| 2,967,211 | 1/1961 | Blackstone et al. | 178—6.7 |
| 2,985,866 | 5/1961 | Norton | 340—173 |
| 3,064,519 | 11/1962 | Shelton | 88—1 |
| 3,084,334 | 4/1963 | Marten et al. | 340—173 |
| 3,195,432 | 7/1965 | Baluteau | 88—2.6 |

References Cited by the Applicant

W. E. Glenn, J. E. Wolfe: "Thermoplastic Recording," International Science and Technology, page 28, June 1962.

W. E. Glenn: "Thermoplastic Recording," Journal of the SMPTE, vol. 69, page 577, September 1960.

H. Kazmierezak, P. Reuschlen: "Automatische Erkennung von Schraffur-Zeichen," Nachtrichten Technische Zeitschrift, page 496, 1961.

L. Cutrona, et al.: "Coherent Optical Data Processing," 1959 Wescon Record, part 4, page 141.

A. Girard: Optica Acta, vol. 7, page 81, January 1960.

L. Mertz, N. O. Young: "Fresnel Transformations of Images," Proceedings of the Conference on Optical Instruments and Techniques, London: Chapman and Hall Ltd.: 1962.

E. L. O'Neill: "Spatial Filtering in Optics," IRE Transactions on Information Theory, pages 56–65, June 1956.

P. Elian, D. S. Grey, and D. Z. Robinson: "Fourier Treatment of Optical Processes," Journal of the Optical Society of America, vol. 42, pages 127–134, Feb. 1952.

Advertisements: Journal of Optical Society of America, vol. 50, 1960, Nos. 1, 2, 1960; vol. 51, No. 5, 1961.

N. F. Barber: Experimental Correlograms and Fourier Transforms, Pergamon Press, New York, 1961.

JAMES W. MOFFITT, *Primary Examiner.*
BERNARD KONICK, J. BREIMAYER,
*Assistant Examiners.*